United States Patent [19]

McStravick et al.

[11] 4,444,420

[45] * Apr. 24, 1984

[54] INSULATING TUBULAR CONDUIT APPARATUS

[75] Inventors: David M. McStravick; David V. Chenoweth, both of Houston, Tex.

[73] Assignee: Baker International Corporation, Orange, Calif.

[*] Notice: The portion of the term of this patent subsequent to Aug. 2, 2000 has been disclaimed.

[21] Appl. No.: 499,996

[22] Filed: Jun. 1, 1983

Related U.S. Application Data

[63] Continuation of Ser. No. 272,411, Jun. 10, 1981, Pat. No. 4,396,211.

[51] Int. Cl.$^3$ ............................................. F16L 9/18
[52] U.S. Cl. ........................................ 285/47; 138/149
[58] Field of Search ......................... 285/47, 53, 398; 138/149

[56] References Cited

U.S. PATENT DOCUMENTS

| | | | |
|---|---|---|---|
| 2,419,278 | 4/1947 | Motsenbocker, Jr. | 138/149 X |
| 2,924,245 | 2/1960 | Wilson | 138/149 |
| 3,369,826 | 2/1968 | Boosey et al. | 285/47 |
| 3,397,745 | 8/1968 | Owens et al. | 166/57 |
| 3,463,691 | 8/1969 | Martin | 138/149 X |
| 3,478,783 | 11/1969 | Doyle | 138/103 |
| 3,511,282 | 5/1970 | Willhite et al. | 138/113 |
| 3,574,357 | 4/1971 | Alexandru | 285/47 |
| 3,763,935 | 10/1973 | Perkins | 166/315 |
| 3,820,505 | 6/1974 | Barber et al. | 166/315 |
| 3,930,568 | 1/1976 | Levey | 138/149 |
| 4,147,381 | 4/1979 | Schwarz | 285/53 |
| 4,332,401 | 6/1982 | Stephenson et al. | 138/149 X |
| 4,340,245 | 7/1982 | Stalder | 285/53 |

FOREIGN PATENT DOCUMENTS 777319 11/1980 U.S.S.R. ............................. 138/149

OTHER PUBLICATIONS

Traynor, Bernard V., General Electric Company, "New Double-Walled Tubulars Can Aid Thermal Recovery Operations," Oil and Gas Journal, (Feb. 1980).

Primary Examiner—Thomas F. Callaghan
Attorney, Agent, or Firm—Norvell & Associates

[57] ABSTRACT

A concentric insulating tubular conduit member for use in forming a conduit string, such as a tubing string in a subterranean well, is disclosed. Each individual concentric conduit comprises an outer tubing and an outwardly flared inner tubing welded to the outer tubing at the end of the flared section. The inner tubing member is formed from an initially straight cylindrical member having enlarged ends and, when outwardly flared, the flared ends, although stretched, have a thickness at least equal to the nominal thickness of the inner tubular member. Insulation may be contained within the annular cavity between the inner and outer tubing members and between inner and outer coupling members at the juncture between adjacent tubing sections.

1 Claim, 5 Drawing Figures

INSULATING TUBULAR CONDUIT APPARATUS

CROSS-REFERENCE TO RELATED APPLICATION

This application is a continuation application of my co-pending application Ser. No. 272,411, filed June 10, 1981, now U.S. Pat. No. 4,396,211, entitled "Insulating Tubular Conduit Apparatus and Method".

BACKGROUND OF THE INVENTION

1. Field of the Invention

This invention generally relates to an insulated conduit having particular utility in subterranean wells and more particularly to a concentric walled insulated conduit having an annular space between the walls within which an insulating material is deposited and sealed therein.

2. Description of the Prior Art

In producing some subterranean wells, steam is injected into an injection well to increase recovery of hydrocarbons by reducing high viscosity crude oil, otherwise known as "heavy crude". The lower viscosity makes the oil more readily pumpable. One technique for doing this is to inject a high quantity of steam into the production zone containing "heavy crude" for an extended period of time, such as from about three to about five weeks. At that point, the viscosity of the heated crude will be reduced and will be readily pumpable through a production well in communication with the production zone. The injection well may also be modified for production. A steam "flood" may also be provided by known techniques, generally through an injection well, to drive the flood and the produced hydrocarbons into a nearby production well.

One of the major problems in injecting steam into a subterranean production zone through conventional well production tubing is that the steam loses a large quantity of its heat to the well bore casing and surrounding formation as it travels downwardly to the production zone. Attempts have been made in the past to reduce the heat loss of steam introduced into subterranean formations. One such attempt is disclosed in U.S. Pat. No. 3,511,282, issued on May 12, 1970. This patent discloses a dual-wall tube structure having insulation sealed in the annulus between the inner and outer walls by bushings respectively welded at each end between the inner wall and the outer wall. The inner wall is prestressed in tension prior to being welded to the outer wall. The space defined between the inner and outer walls is filled with a conventional insulating material such as calcium silicate. Although this technique may be satisfactory in some oil field installations, it is not satisfactory for all oil field installations where large temperature differentials are encountered between the inner and outer walls. In this case, even though the inner wall is prestressed in tension, the inner wall, as it is heated, will elongate with respect to the outer wall so that the inner wall may even change from a tension to a compression condition with the attendant danger of buckling. The magnitudes of the forces generated are such that localized stresses are created in the weld areas causing cracks which permit exposure of the insulation to well fluids and eventually causing failure or degradation of the insulating structure. Centralizers are incorporated to reduce buckling, but may also, in turn, contribute to a loss of heat because of the generally durable nature of such devices.

Another known technique of handling the aforedescribed inner and outer walls of an insulating tube is to place a thin walled bellows between the two walls at each end of the assembly, one end of each of the bellows being rigidly attached to the inner wall, and the other end of the bellows being rigidly attached to the outer wall. This technique, of course, relieves the strain on the welds and joining structure between the walls due to the relative movement between the inner and outer walls. However, the bellows introduce other problems; namely, the bellows are comparatively thin walled and delicate, being typically formed from a heat resistant, springy material, which cannot withstand the rough handling normally encountered in the oil patch.

A concentric walled thermal insulating conduit is also disclosed and claimed in U.S. patent application, Ser. No. 264,728, entitled CONCENTRIC WALLED CONDUIT FOR TUBULAR CONDUIT STRING. This tubular conduit comprises concentric tubular members in which the inner tubular member is corrugated and has flared ends welded to the outer tubular member adjacent each end. Insulation is provided within the annular area between the two tubular members for reducing heat loss during steam injection.

SUMMARY OF THE INVENTION

A concentric walled insulating tubular conduit for forming a tubular string in a subterranean well has an inner tubing member with flared ends. The flared ends of the tubing, with a thickness at least equal to the nominal thickness of the inner tubing intermediate the ends, is welded to the outer tubing. Only two welds per individual conduit are necessary. The flared inner ends are fabricated by forging the ends of a tubular member having upset or enlarged ends. Although the thickness of the ends will be reduced by the forging operation, the flared ends will remain relatively thick, thus adding to the integrity of the weld. The inner tubing member is preferably prestressed in tension relative to the outer tubular member.

An exterior coupling joins adjacent members by conventional threaded engagement with the outer tubing and an inner coupling member extends between flared sections of the inner tubing ends. Insulation may be incorporated between the interior and exterior coupling and in the annular cavity between the inner and outer tubing. Blanket insulation, rigid load-bearing insulating members, and a shield having a low thermal emmissivity are provided in the axially extending cavity.

The concentric walled conduit is preferably fabricated by using standard tubular members used in oil and gas wells, the inner tubing originally having upset ends. Fabrication utilizing these standard tubular members yields a concentric walled tubular member in which only two welds would be necessary on each conduit section for joining the flared end sections of at least nominal tubing thickness to the outer tubing. These flared end sections, however, remain relatively long and thin, thus reducing the path available for conductive heat transfer.

DESCRIPTION OF THE PREFERRED EMBODIMENT

Figure 1:
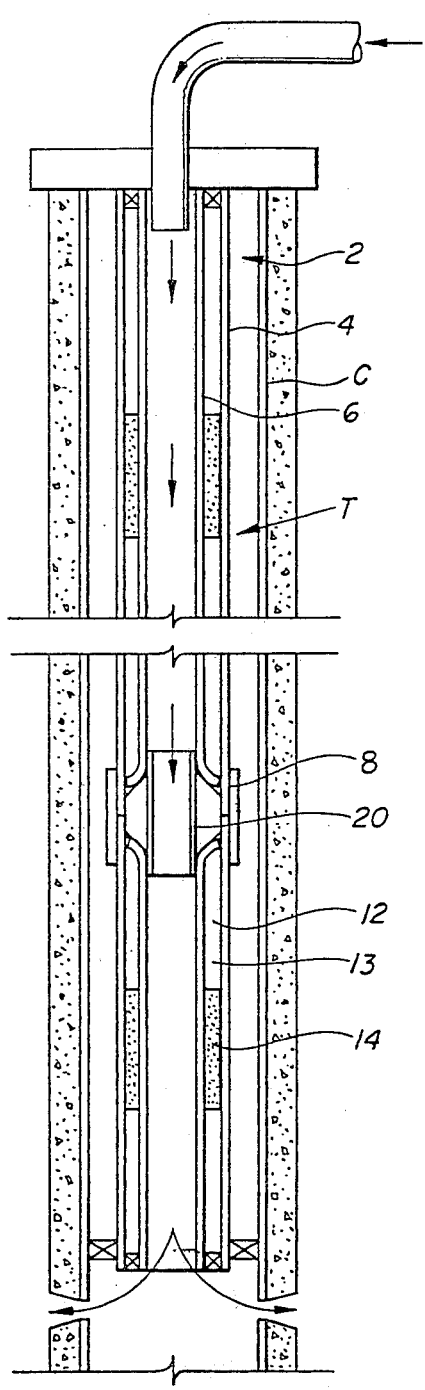
FIG. 1 is a schematic illustrating the injection of steam through a tubing string formed of individual conduit members constructed in accordance with this invention.

FIG. 1 illustrates, in schematic form, the use of a plurality of sections comprising concentric walled insulating tubing members formed in accordance with this invention, to construct an insulating tubing string. The tubing string T, shown in FIG. 1, permits the injection of steam at the surface of the well through the tubing to the formation therebelow. The insulating tubing string ensures that the heat loss between the surface and the formation will not be so excessive as to defeat the function of steam injection. The tubing string T, comprising a plurality of individual insulating tubing conduits 2, is positioned within the well and within the well casing C in much the same manner as a conventional tubing string.

Figure 2:
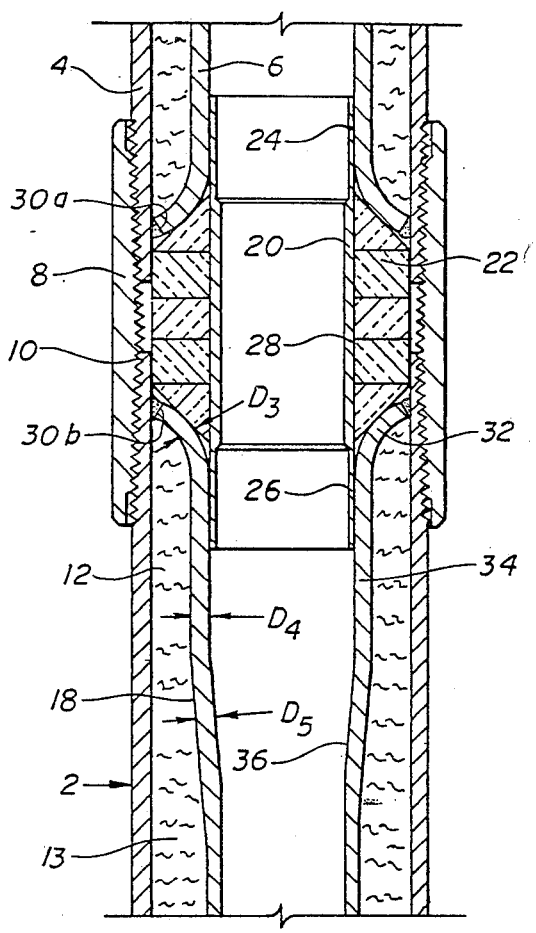
FIG. 2 shows two conduits coupled at their ends and this section view depicts the components of the preferred embodiment of this invention.
Figure 2:
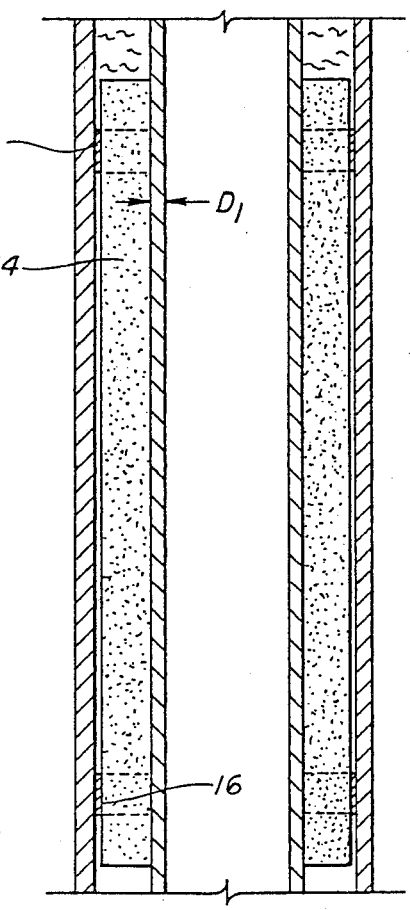

FIG. 2 shows the components of each individual conduit and the interconnection between adjacent abutting tubular conduits. It will be understood that the opposite ends of each individual conduit is of generally the same configuration as is shown in FIG. 2. Each individual concentric insulating member 2 comprises an outer tubing 4 and an inner tubing 6. The outer tubing 2 comprises a straight cylindrical member having conventional threads 10 at each end. A conventional external coupling 8, engaging threads 10, can be used to join adjacent concentric members. In order to reduce the number of welds needed to secure inner tubing 6 to outer tubing 4, the end of inner tubing 6 is outwardly flared, as shown in FIG. 2. A single circular face weld 30 can then be made between inner tubular 6 and outer tubular 4. The reforming of inner tubing 6 results in flared ends having substantially three sections. First outer section 32 generally comprises a radiused portion having an effective radius of curvature approximately equal to or on the order of the separation between the inner and outer tubing. The radius of curvature need not be limited to this separation distance, but a desirable structure can be constructed by employing a radius of curvature of that order of magnitude. As shown in FIG. 2, the thickness of this radiused portion would be generally equal to a value, $D_3$. Adjacent the outer radiused section 32 on each end of inner tubing 6, is a tapered section 34. The degree of taper in this section need not be large and, in the preferred embodiment of this invention, a radially outward taper of 1° is employed in section 34. In the preferred embodiment of this invention, a second more significantly tapered section 36 is employed to form a transition between the 1° tapered section 34 and the central portion of the inner tubing 6. This transition section 36, in the preferred embodiment of this invention, has a taper equal to approximately 5°.

In the assembled configuration of a single insulating tubing conduit, as shown in FIG. 2, an annular cavity 13 is formed between outer tubing 4 and inner tubing 6. This annular cavity 13 may be filled with thermal insulation. In the preferred embodiment of this invention, this thermal insulation comprises a combination of a blanket insulation 12 having ceramic fibers, at least one rigid insulating member 14, and a reflective heat shield 18. At least one rigid cylindrical insulating member 14 is located within annular cavity 13 between the welded ends joining outer tubing 4 to inner tubing 6. In the preferred embodiment of this invention, this rigid insulating member comprises a molded, high temperature pipe and block insulating composed by hydrous calcium silicate. This molded calcium silicate member 14 provides structural support between inner tubing member 6 and outer tubing member 4 between the ends of annular cavity 13. In the preferred embodiment of this invention, insulating member 14 comprises a conventional pipe and block insulating member which is commercially available. One molded calcium silicate pipe and block insulation member that can be used in this invention is manufactured by Johns-Manville and is commonly refered to under the trademark "Thermo-12". These standard pipe and block insulation members are available in half-sections which can be positioned in surrounding relationship with respect to inner tubing 6. Metal bands 16 can then be attached annular insulating member structurally supporting the outer tubing 4 relative to the inner tubing 6.

The remainder of annular cavity 13 contains a blanket insulation 12, which is also commercially available. Thermal insulating blankets, composed of long mechanically bonded refractory fibers providing a combination of high blanket strength, flexibility and high thermal performance, are commercially available. In the preferred embodiment of this invention, a thermal insulating blanket of the type manufactured by Johns-Manville under the trademarks "Thermo-Mat" or "Ceratex", has been employed to form a convective insulating barrier within annular cavity 13. This insulating blanket can be secured to the inner tubing between calcium silicate insulating members 14 and the ends of annular cavity 13. This insulating blanket 12 can be secured to inner tubing 4 by wrapping a conventional glass fiber tape around the exterior of the insulating blanket 14. When employed in combination, blanket insulation 12 and the rigid calcium silicate insulating member 14 should substantially fill annular cavity 13 between the inner and outer tubings. In the preferred embodiment of this invention, at least a partial vacuum is established in annular cavity 13 to prevent moisture from degrading the performance of the convective insulation.

In addition to the convective insulating barriers provided by blanket insulation 12 and rigid insulating member 14, a radiant reflective heat shield member 18 can be provided. In the preferred embodiment of this invention, this reflective heat shield is incorporated on the outer surface of inner tubing 6, and comprises a material having a relatively low thermal emissivity. In this embodiment, aluminum foil has been applied around inner tubing 6. This aluminum foil comprises a reflective surface which will further reduce the heat transfer of this tubing assembly.

Annular cavity 13 provides sufficient space to contain insulation for maintaining appropriate heat transfer characteristics over most of the length of this tubing. There does, however, remain a space between interior flared ends on adjacent tubing members. An interior coupling or cylindrical spacer member 20 can be employed to completely isolate the area otherwise bounded by the flared inner tubing ends of adjacent conduits and the outer coupling 8. This interior coupling 20 comprises a cylindrical member having outer sections 24 and 26 having a thickness which is less than the thickness of the central section 28 of the interior coupling member. As shown in FIG. 2, the ends 24 and 26 can be wedged into engagement with the tapered section 34 of each inner tubing member 6. Insulation can then be positioned around the exterior of interior coupling 20 to reduce heat loss in the vicinity of the coupling. In the preferred embodiment of this invention, blanket insulation of the same type as blanket insulation 12 used within annular cavity 13 can be affixed around interior coupling central section 28 in a donut fashion. The blanket insulation then fills the cavity bounded by the radiused ends of adjacent interior tubing members and the interior and exterior coupling members. An assembled tubing string or conduit comprising a plurality of individual insulating tubing conduits 2 would then have insulating material positioned within the annular space between inner tubing 6 and outer tubing 4 along substantially the entire length of the insulating tubing conduit 2. Finally, a second low emissivity barrier or radiant heat shield is provided on the exterior of the outer tubing. The outer tubing can be painted along its entire length to provide this barrier. Two low emissivity barriers will then act to reduce heat transfer over most of the tubing.

The flared ends of inner tubing 6 not only provide an effective means of increasing the performance of the welds, both by reducing their number and by increasing the welded area, but they should also provide for low heat loss by means of conduction through the welded joint. The only heat conductivity path between the junction of the interior coupling 20 and the tapered portion 34 of inner tubing 6 is along the relatively long thin flared tubing itself. No relatively wide bushing member with its inherently greater heat conductivity is necessary. Still, the flared portion of the tubing is thick enough to provide a weld of high integrity.

FABRICATION

Figures 3, 4:
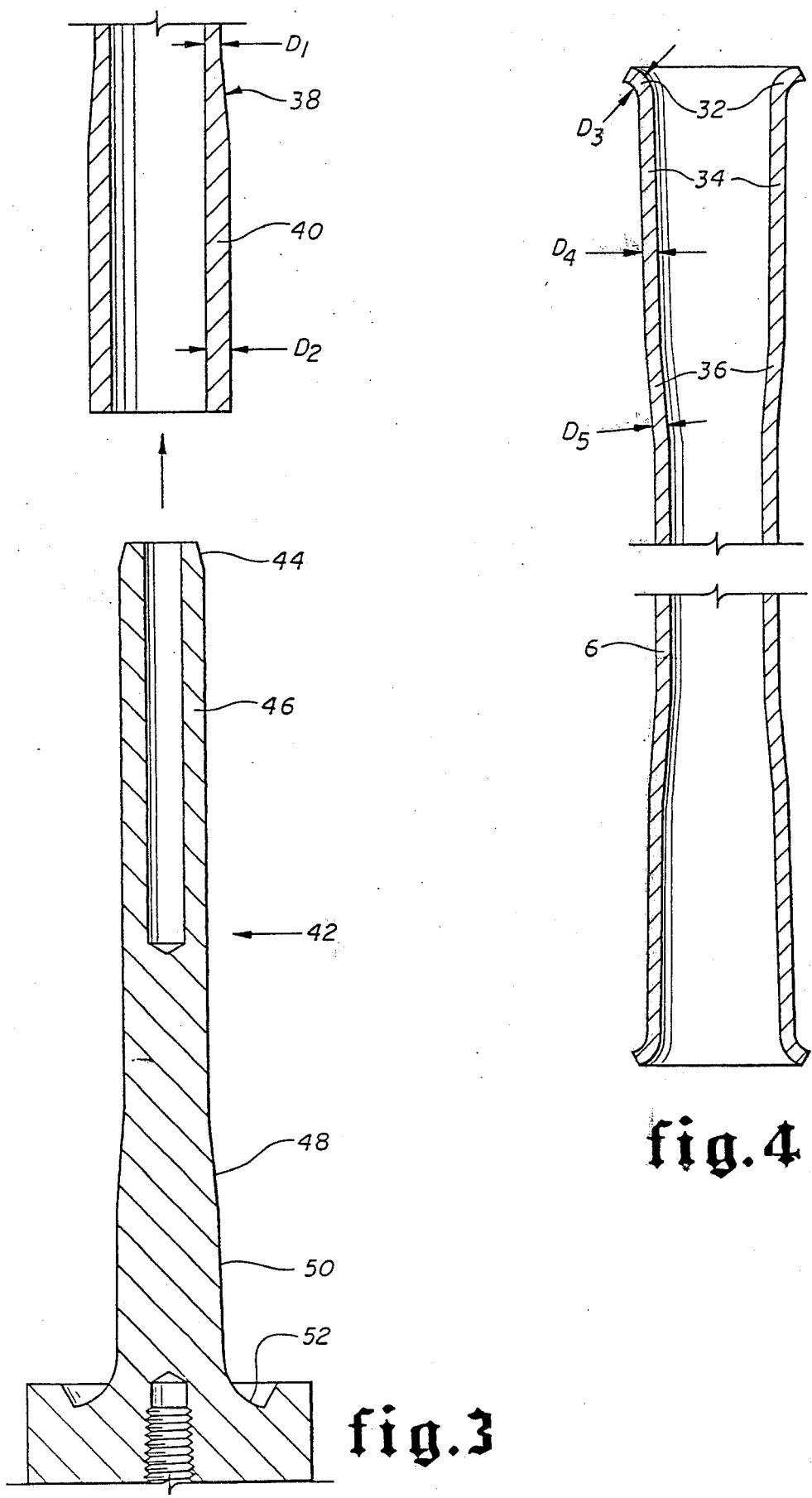
FIG. 3 illustrates the forging operation in which a conventional upset tubular is flared by use of a swage to form the inner tubing of the concentric insulating member.
FIG. 4 shows the profile of an upset tubular after the ends have been flared for use as the inner conduit of the concentric walled tubular assembly.

One very significant feature of the preferred embodiment of this invention is that it can be fabricated using only conventional and commercially available components. While the concentric conduit 2 can be fabricated by using a wide variety of cylindrical members, the preferred embodiment of this invention can be fabricated by using standard American Petroleum Institute tubulars. In one size, this invention may utilize a standard $2\frac{3}{8}$ths inch O.D. A.P.I. J-55 tubing having upset or enlarged ends to allow fabrication of the flared inner tubing 6. In the same configuration, a $4\frac{1}{2}$ inch A.P.I. J-55 casing having non-upset ends can be employed for outer tubing 4. The standard tubing shown in FIG. 3, such as $2\frac{3}{8}$ths inch O.D. J-55 tubing, has a nominal thickness $D_1$ along most of the tubing. This nominal thickness $D_1$ is less than the thickness $D_2$ of the upset ends. The ends of the standard J-55 tubing can be flared to their final configuration by utilizing a forging operation employing a swage 42, shown in FIG. 3. The swage has a beveled portion 44 at its end. Adjacent this beveled entry surface 44 is a cylindrical or guide portion 46 which serves to align the tubing during the forging operation. A swage transition profile 48, having a radially outward taper extends from the lower end of guide section 46. This transition profile constitutes a mirror image of the transition section 36 of the fabricated inner tubing member 6. In the preferred embodiment of this invention, the taper of this transition section would be on the order of 5°. Adjacent the transition section 48 is a swage tapered profile 50 which corresponds to the tapered section 34 of the fabricated inner tubing 6. Tapered profile 50 has a taper which is less than the taper of transition profile 48, and in the preferred embodiment this swage profile has a taper of approximately 1° to match the taper of the transition section 34. At the lower end of the swage is a radiused profile 52. As with profile sections 48 and 50, the radiused profile 52 is intended to match the cooperating section on the final inner tubing member 6. Radiused section 32 of inner tubing 6 will be formed as the outer end of a standard upset J-55 tubing is forged by radiused profile 52. It should be understood that although profile 52 is herein referred to as a radiused profile, it need not be generated by a constant radius of curvature. The term "radiused profile" is merely intended to indicate that the outward flaring of tapered section 36 generated by profile 52 is significantly greater than that of adjacent sections 32 and 34 is inner tubing 6. It is believed that the term "radiused profile" is appropriate, however, since the actual profile would at least closely approximate a surface having a constant radius of curvature. Since the principal purpose of this radiused section is to provide radially traverse the separation between inner tubing 6 and outer tubing 4, an effective radius of curvature on the order of magniture of the spacing between outer tubing 4 and inner tubing 6 should be effective to form this profile. As can be seen in FIG. 3, the final shape of inner tubing 6 can be fabricated by driving swage 42 into a standard tubular 38 having enlarged or upset ends 40. Preferably, the portion of a standard tubular 38 adjacent the upset ends 40 would be heated prior to this forging process. When the swage is driven into the end of the tubular, the tubular radially expands to form the flared end profiles desired for the preferred embodiment of this invention. During the course of this forging process, the ends of the standard tubular 38 would not only be radially flared but they would be stretched by the forging process. As the end is stretched the thickness of each tubular would be reduced. The flared inner tubing 6 would have a radiused section 32 having a thickness $D_3$, a tapered section 34 having a thickness $D_4$, and a transition section 36 having a thickness $D_5$. If the flaring and stretching of the material of the standard tubular is confined to the upset ends 40, the thicknesses, $D_3$, $D_4$ and $D_5$ can be greater than or at least equal to the nominal thickness $D_1$ of a standard tubular. Even if the final thickness is slightly less than the nominal wall thickness of the tubing, the use of tubing initially having upset or enlarged ends should promote greater structural integrity in the flared ends of the tubing. The stretching will, however, reduce the thicknesses $D_3$, $D_4$ and $D_5$ to a value less than the original thickness $D_2$ of the upset tubular ends 40. A significant advantage to forming the inner tubing 6 from a standard tubular having upset ends can be seen in that even though the thickness of the standard upset ends is reduced, the thickness $D_3$ of radiused section 32 can still be larger than the nominal thickness $D_1$ of the inner tubing member. This increased thickness should enhance the structural integrity of the welds 30A and 30B along the radiused sections 32 to the outer tubular member 4. The welds will extend over a larger surface area and the thickness of the inner tubing adjacent the welds, including radiused section 32, tapered section 34, and transition section 36, will not be reduced below the nominal thickness of the tubing. This improved weld integrity would, in addition to the weld reliability improvement, be gained by reducing the number of welds at each end.

After both ends of a single inner tubing member 6 have been flared by the forging process depicted in FIG. 3, the final configuration of inner tubing 6 will be that shown in FIG. 4. At this point, the reflective heat shield or low emissivity barrier can be applied to the outer surface of inner tubing 6. In the preferred embodiment, aluminum foil would be wrapped around the inner tubing. The rigid insulation members 14 may then be attached at appropriate positions along the exterior of the inner tubing by placing two half sections around the tubing with metal bands securing the calcium silicate members together. Blanket insulation 12 can then be attached over the remaining portion of inner tubing 6.

The next step in the fabrication of the final insulating tubing conduit 2 would be the insertion of the inner tubing-insulation assembly into outer tubing 4. Upon insertion, the continuous circumferential surface formed at each free end of the flared inner tubing is portioned adjacent to the interior of the outer tubing around its complete inner circumference and is in position to be attached to the outer tubing. The radiused end of inner tubing 6 can then be welded to outer tubing 4 along one end of the concentric tubing assembly. This first weld 30A extends completely around the junction between inner tubing radius section 32 and the outer tubing 4. Multiple passes may be used to ensure that this weld is structurally sound and completely seals the juncture between inner and outer tubing.

In the preferred embodiment of this invention, it is desired to prestress the tubing assembly by placing the inner tubing 6 in tension and the outer tubing 4 in compression. This prestress is important because of the loads which will be imparted to the conduit during high temperature operation. The outer tubing, although in compression, would serve to maintain the inner tubing member 6 substantially in its prestressed or preexpanded configuration. The length of the concentric tubing assembly should therefore be substantially the same in both the cooled and heated configuration. In addition, the stresses in the concentric tubing assembly should be reduced during operation at elevated temperatures. After the first weld 30A has secured one end of inner tubing to outer tubing, the desired prestress may be imparted by stretching the inner tubing 6 at the opposite end of the concentric tubing assembly. This stretching operation can be accomplished by mechanically pulling the inner tubing while holding the outer tubing fixed, or by heating the inner tubing relative to the outer tubing. In the preferred embodiment of this invention, the inner tubular member 6 would not be initially prestressed beyond its yield point. After the desired amount of prestress is imparted to the inner tubing, a second weld 30B extending completely around the junction between inner tubing and outer tubing is made. Again, this weld may consist of multiple passes to ensure the integrity of the weld.

Welds 30A an 30B have not only secured inner tubing member 6 to outer tubing member 4, but have sealed the annular insulating cavity 13 between the inner and outer tubing. In the preferred embodiment of this invention, it is desirable to increase the insulating capacity of the material in annular cavity 13 by withdrawing the gasses in annular cavity 13 to establish a vacuum. This vacuum may be established by initially drilling a hole in, or otherwise piercing, the outer tubing 4 to form an opening in the annular cavity 13.

Figure 5:
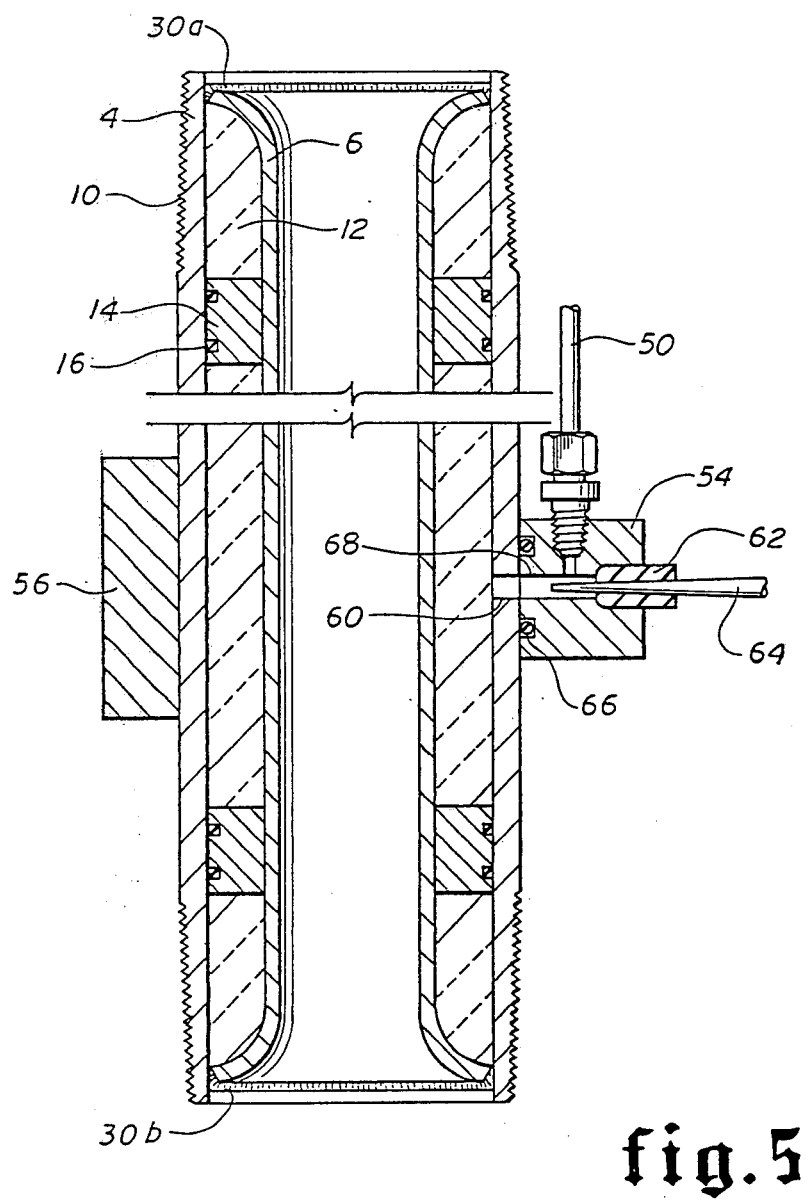
FIG. 5 depicts the means of forming a vacuum within the annular insulating cavity in this invention.

A fixture 54, shown in FIG. 5, can be used for drilling a hole into the outer tubing 6 and for evacuating the gases from annular cavity 13. This fixture comprises a clamp 56 extending around the exterior of outer tubing 6. A passage 68 extends through fixture 54 radially to the outer surface of tubing 6. A drill bushing, not shown, can be inserted into passage 68 and an opening or hole 60 can be drilled into the outer tubing 6 in alignment with radially extending passage 68. The same fixture can then be used to establish at least a partial vacuum in annular cavity 13 without losing alignment with the drilled hole 60. The drill bushing can be removed and a plug, such as a tapered pin, surrounded by an annular seal 62 can be inserted into passage 68, as shown in FIG. 5. A vacuum hose 58 can then be attached between fixture 54 and a vacuum pump (not shown). Vacuum hose 58 communicates through passage 68 to the interior annular cavity 13. An O-ring seal 66, between vacuum fixture 54 and the exterior of concentric insulating conduit 2, prevents leakage during evacuation of annular chamber 13. The tapered pin 64 extending into passage 68 and the circumferential seal 62 extending around tapered pin 64 prevent leakage through passage 68 past tapered pin 64. After a suitable vacuum has been established within annular cavity 13, tapered pin 64 may then be driven into drill hole 60 to close that hole. The outer portion of pin 64 extending beyond the surface of outer tubing 4 can then be removed, and, if necessary, a weld could be employed to seal this pin.

After fabrication of the individual conduits, a plurality of conduits may be assembled to form an insulated tubing string by first inserting an internal coupling 20 in one end of each separate tubular members. The interior coupling is wedged into the flared end of inner tubular member 6. Preferably, each interior coupling member 20 would be inserted farther into one conduit than into the adjacent conduit. If the interior coupling member 20 is wedged into the tapered section 34 of one member farther than into the other, the interior coupling would remain affixed to a designated member upon disassembly. Field disassembly could then be simplified.

The preferred embodiment of this invention thus comprises a prestressed concentric tubing member having thermal insulation along substantially its entire length. Convective, as well as radiant insulation, is provided and the evacuation of the annular cavity between the two concentric tubing members removes residual moisture and reduces the heat transfer through the insulation. The preferred embodiment also employs only two welds for each individual conduit. The integrity of the welds employed in this invention is increased by both reducing their number and by employing flared inner tubing sections in which the thickness of the flared ends is not reduced below the nominal thickness of the intermediate sections of the inner tubing member. Furthermore, individual concentric insulating tubing members 2 have been fabricated using conventional tubing members.

Although the invention has been described in terms of the specified embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A concentric walled insulating tubular conduit for forming a tubular string in a subterranean well to transport a heated fluid between the surface of the well and a subterranean location while minimizing the heat loss from the heated fluid during transport, comprising: an outer tubular member; an inner concentric tubular member having at least one outwardly flared end, said inner tubular member initially comprising a tubular member with at least one enlarged upset end with a wall thickness greater than the nominal wall thickness of the tubular member intermediate the ends, said outwardly flared end having a wall thickness greater than the nominal wall thickness of said inner tubular member intermediate the ends thereof and less than the wall thickness of the initially upset end; welded connections at both ends of the inner tubular member to the outer tubular member with a single circumferential weld joining a flared end of the inner tubular member directly to the outer tubular member at the flared end with greater wall thickness, said inner tubular member being spaced from said outer tubular member intermediate the welded ends thereof to define an annular insulating cavity therebetween, said flared end on the inner tubular member defining one end of said annular insulating cavity, said welded connections forming a seal for said annular insulating cavity.

* * * * *